(12) United States Patent
Su (10) Patent No.: US 12,387,305 B2
(45) Date of Patent: Aug. 12, 2025

(54) COLOR TRANSFORMATION FOR HDR VIDEO WITH A CODING-EFFICIENCY CONSTRAINT

(71) Applicant: Dolby Laboratories Licensing Corporation, San Francisco, CA (US)

(72) Inventor: Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 354 days.

(21) Appl. No.: 18/248,309

(22) PCT Filed: Oct. 14, 2021

(86) PCT No.: PCT/US2021/054994
§ 371 (c)(1),
(2) Date: Apr. 7, 2023

(87) PCT Pub. No.: WO2022/081851
PCT Pub. Date: Apr. 21, 2022

(65) Prior Publication Data
US 2023/0368344 A1   Nov. 16, 2023

Related U.S. Application Data

(60) Provisional application No. 63/091,436, filed on Oct. 14, 2020.

(30) Foreign Application Priority Data

Oct. 14, 2020   (EP) .................................... 20201683

(51) Int. Cl.
*G06T 5/90* (2024.01)
*G06V 10/56* (2022.01)
(Continued)

(52) U.S. Cl.
CPC ................ *G06T 5/90* (2024.01); *G06V 10/56* (2022.01); *G06V 10/60* (2022.01); *H04N 19/186* (2014.11);
(Continued)

(58) Field of Classification Search
None
See application file for complete search history.

(56) References Cited

U.S. PATENT DOCUMENTS 8,811,490 B2   8/2014   Su
9,467,704 B2   10/2016   Ten
(Continued)

FOREIGN PATENT DOCUMENTS

JP   2014204332 A   10/2014
JP   2016213828 A   12/2016
(Continued)

OTHER PUBLICATIONS

François, E.; van de Kerkhof, L., "A Single-Layer HDR Video Coding Framework with SDR Compatibility," SMPTE Motion Imaging Journal, vol. 126, Issue 3, Apr. 6, 2017.
(Continued)

*Primary Examiner* — David Ometz (57) ABSTRACT

Using a standard-based RGB to YCbCr color transform, a new RGB to YCC 3×3 transformation matrix and a 3×1 offset vector are derived under a set of coding-efficiency constraints. The new RGB to YCC 3×3 transform comprises a luminance scaling factor and a 2×2 chroma sub-matrix that preserves the energy of the standard-based RGB to YCbCr transform while maintaining or improving coding efficiency. It also adds support for an authorization or watermarking mechanism in streaming video applications. Examples of using the new color transform using image reshaping are also provided.

15 Claims, 2 Drawing Sheets

(51) Int. Cl.
  *G06V 10/60* (2022.01)
  *H04N 19/186* (2014.01)
(52) U.S. Cl.
  CPC .............. *G06T 2207/10024* (2013.01); *G06T 2207/20208* (2013.01)

(56) References Cited

U.S. PATENT DOCUMENTS

| | | | |
|---|---|---|---|
| 10,158,836 B2 | 12/2018 | Hsieh | |
| 10,244,249 B2 | 3/2019 | Ramasubramonian | |
| 10,264,287 B2 | 4/2019 | Wen | |
| 10,542,289 B2 | 1/2020 | Yin | |
| 11,277,627 B2 | 3/2022 | Song | |
| 2016/0286241 A1 | 9/2016 | Ridge | |
| 2016/0323556 A1 | 11/2016 | Luginbuhl | |
| 2019/0028706 A1 | 1/2019 | Minoo | |
| 2019/0364301 A1 | 11/2019 | Atkins | |
| 2020/0169742 A1 | 5/2020 | Su | |
| 2020/0288132 A1 | 9/2020 | Baylon | |
| 2020/0349685 A1 * | 11/2020 | Andrivon | H04N 19/46 |
| 2021/0006793 A1 | 1/2021 | Minoo | |

FOREIGN PATENT DOCUMENTS

| | | | | |
|---|---|---|---|---|
| JP | 2018525905 A | 9/2018 | | |
| WO | 2010004726 A1 | 1/2010 | | |
| WO | WO-2016120209 A1 * | 8/2016 | ............... | G06T 5/00 |
| WO | WO-2016120330 A1 * | 8/2016 | ........... | H04N 19/126 |
| WO | 2017024042 A2 | 2/2017 | | |
| WO | 2019108882 A1 | 6/2019 | | |
| WO | 2019217751 A1 | 11/2019 | | |
| WO | 2020185984 A1 | 9/2020 | | |

OTHER PUBLICATIONS

Rec. ITU-R BT. 2020, "Parameter values for ultra-high definition television systems for production and international programme exchange," ITU, Jun. 2014.

Rec. ITU-R BT. 709, "Parameter values for the HDTV standards for production and international programme exchange," ITU, Jun. 2015.

* cited by examiner

COLOR TRANSFORMATION FOR HDR VIDEO WITH A CODING-EFFICIENCY CONSTRAINT

CROSS-REFERENCE TO RELATED APPLICATIONS

This application is a U.S. National Stage application under U.S.C. 371 of International Application No. PCT/US2021/054994, filed on Oct. 14, 2021, which claims priority of U.S. Provisional Patent Application No. 63/091,436, filed Oct. 14, 2020, and European Patent Application No. 20201683.8, filed Oct. 14, 2020, both all of which are incorporated herein by reference in their entirety.

TECHNOLOGY

The present disclosure relates generally to images. More particularly, an embodiment of the present invention relates to color transformation and processing for high dynamic range (HDR) video with a coding-efficiency constraint.

BACKGROUND

As used herein, the term 'dynamic range' (DR) may relate to a capability of the human visual system (HVS) to perceive a range of intensity (e.g., luminance, luma) in an image, e.g., from darkest grays (blacks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the 14-15 orders of magnitude of the human visual system (HVS). In practice, the DR over which a human may simultaneously perceive an extensive breadth in intensity range may be somewhat truncated, in relation to HDR. As used herein, the terms visual dynamic range (VDR) or enhanced dynamic range (EDR) may individually or interchangeably relate to the DR that is perceivable within a scene or image by a human visual system (HVS) that includes eye movements, allowing for some light adaptation changes across the scene or image. As used herein, VDR may relate to a DR that spans 5 to 6 orders of magnitude. Thus, while perhaps somewhat narrower in relation to true scene referred HDR, VDR or EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). For example, using gamma luminance coding, images where n≤8 (e.g., color 24-bit JPEG images) are considered images of standard dynamic range, while images where n≥10 may be considered images of enhanced dynamic range. HDR images may also be stored and distributed using high-precision (e.g., 16-bit) floating-point formats, such as the OpenEXR file format developed by Industrial Light and Magic.

Most consumer desktop displays currently support luminance of 200 to 300 $cd/m^2$ or nits. Most consumer HDTVs range from 300 to 500 nits with new models reaching 1,000 nits ($cd/m^2$). Such conventional displays thus typify a lower dynamic range (LDR), also referred to as a standard dynamic range (SDR), in relation to HDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 1,000 nits to 5,000 nits or more).

As used herein, the term "forward reshaping" denotes a process of sample-to-sample or codeword-to-codeword mapping of a digital image from its original bit depth and original codewords distribution or representation (e.g., gamma, PQ, HLG, and the like) to an image of the same or different bit depth and a different codewords distribution or representation. Reshaping allows for improved compressibility or improved image quality at a fixed bit rate. For example, without limitation, reshaping may be applied to 10-bit or 12-bit PQ-coded HDR video to improve coding efficiency in a 10-bit video coding architecture. In a receiver, after decompressing the received signal (which may or may not be reshaped), the receiver may apply an "inverse (or backward) reshaping function" to restore the signal to its original codeword distribution and/or to achieve a higher dynamic range.

Because of bit-depth limitations and potential need for backward compatibility, in a typical single-layer HDR-distribution scenario, HDR content is transmitted as a combination of an SDR base layer and metadata. A legacy decoder can extract a viewable SDR stream from the SDR base layer, but a newer HDR decoder may apply the metadata to the SDR base layer to reconstruct an HDR version closely approximating the original HDR source. As appreciated by the inventor here, improved techniques for combining content protection and improving coding efficiency in such distribution of HDR content are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Methods for color transformations under a coding-efficiency constraint for the coding of HDR video are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

SUMMARY

Example embodiments described herein relate to color transformations under a coding-efficiency constraint for the coding of HDR images. In an embodiment, a processor:
  receives an input image in a first dynamic range and in a first color space;
  accesses a first 3×3 color-transform matrix and a first 3×1 offset vector based on a color transform from the first color space to a standard-based color space;
  applies (210) to the input image the first 3×3 color-transform matrix to generate a first image with luminance and chroma components;
  generates minimum and maximum pixel values for the first image for the luminance and the chroma components;
  computes (215) a luminance scaler based on the minimum and maximum luminance pixel values in the first image;
  computes elements of a 2×2 chroma-transform matrix based on a coding-efficiency constraint and the first 3×3 color-transform matrix;
  forms a 3×3 intermediate transform matrix based on the luminance scaler and the 2×2 chroma-transformation matrix;
  applies (225) the 3×3 intermediate transform matrix to the first image to generate a second image;
  generates an intermediate 3×1 offset vector based on the first offset vector and minimum and maximum pixel values in the luminance and chroma components of the second image; and generates (230):
    an output 3×3 color-transform matrix by multiplying the first 3×3 color-transform matrix with the 3×3 intermediate transform matrix;
    an output 3×1 offset vector by adding the first 3×1 offset vector to the intermediate 3×1 offset vector; and
    an output image in a second color space by adding to pixel values of the second image the output 3×1 offset vector.

EXAMPLE HDR CODING SYSTEM

Figure 1A:
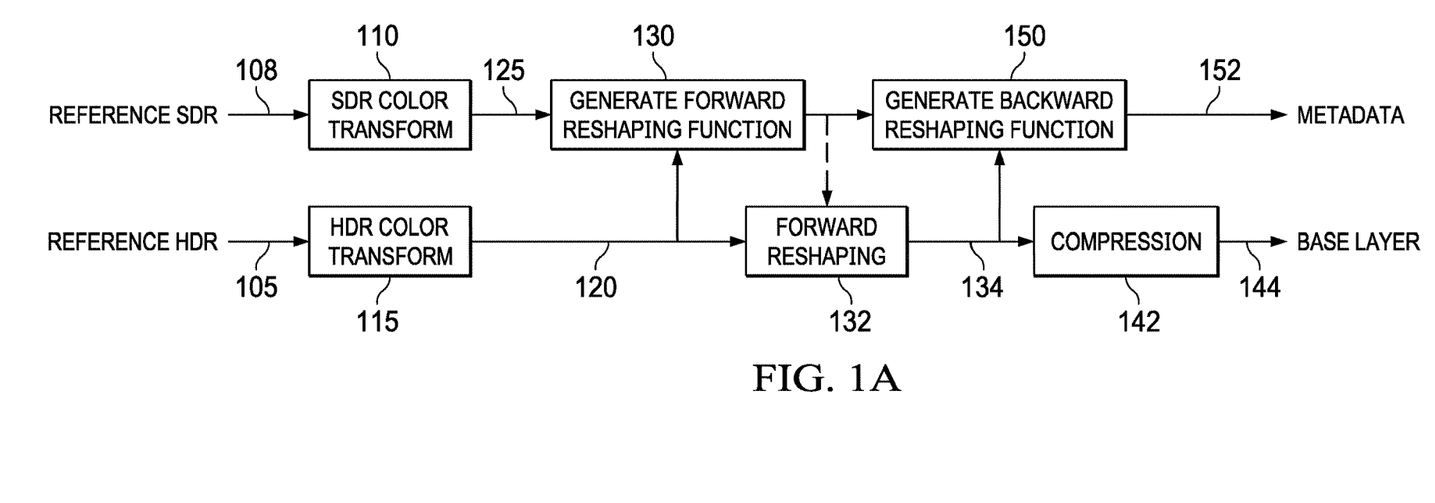
FIG. 1A depicts an example single-layer encoder for HDR data using color transformations and a reshaping function according to an embodiment.
Figure 1B:
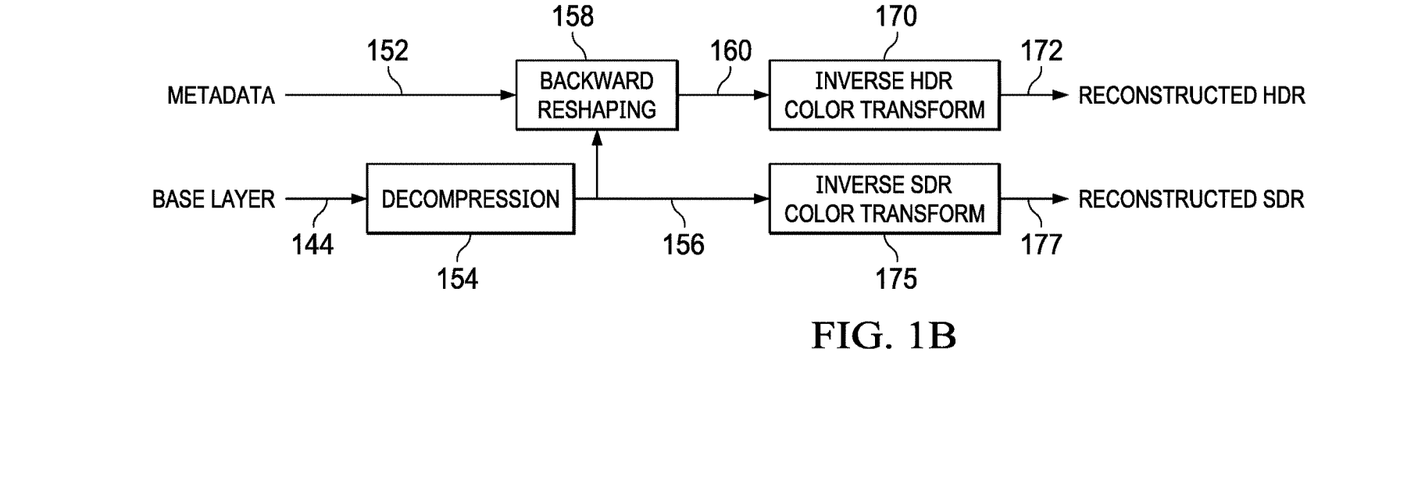
FIG. 1B depicts an example HDR decoder corresponding to the encoder of FIG. 1A, according to an embodiment.

FIG. 1A and FIG. 1B illustrate according to an embodiment an example single-layer backward-compatible codec framework using both color transformations and image reshaping. More specifically, FIG. 1A illustrates an example encoder architecture, which may be implemented with one or more computing processors in an upstream video encoder. FIG. 1B illustrates an example decoder architecture, which may also be implemented with one or more computing processors in one or more downstream video decoders.

Under this framework, given reference HDR content (105) and corresponding reference SDR content (108) (that is, content that represents the same images as the HDR content, but color-graded and represented in standard dynamic range), reshaped SDR content (134) is encoded and transmitted as SDR content in a single layer of a coded video signal (144) by an upstream encoding device that implements the encoder architecture. The received SDR content is received and decoded, in the single layer of the video signal, by a downstream decoding device that implements the decoder architecture. Backward-reshaping metadata (152) is also encoded and transmitted in the video signal with the reshaped content so that HDR display devices can reconstruct HDR content based on the (reshaped) SDR content and the backward reshaping metadata. Without loss of generality, in some embodiments, as in non-backward-compatible systems, reshaped SDR content may not be watchable on its own, but must be watched in combination with the backward reshaping function, which will generate watchable SDR or HDR content. In other embodiments which support backward compatibility, legacy SDR decoders can still playback the received SDR content without employing the backward reshaping function.

As illustrated in FIG. 1A, given an HDR image (120), its corresponding SDR image (125), and a target dynamic range, after generating, in step 130, a forward reshaping function, then, given the forward reshaping function, a forward reshaping mapping step (132) is applied to the HDR images (120) to generate reshaped SDR base layer (134). A compression block (142) (e.g., an encoder implemented according to any known video coding algorithms, like AVC, HEVC, AV1, VVC, and the like) compresses/encodes the SDR images (134) in a single layer (144) of a video signal. In addition, a backward reshaping function generator (150) may generate a backward reshaping function which may be transmitted to a decoder as metadata (152). In some embodiments, metadata (152) may represent the forward reshaping function (130), thus, it would be up to the decoder to generate the backward reshaping function (not shown).

Examples of backward reshaping metadata representing/ specifying the optimal backward reshaping functions may include, but are not necessarily limited to only, any of: an inverse tone mapping function, inverse luma mapping functions, inverse chroma mapping functions, lookup tables (LUTs), polynomials, inverse display management coefficients/parameters, etc. In various embodiments, luma backward reshaping functions and chroma backward reshaping functions may be derived/optimized jointly or separately, may be derived using a variety of techniques, for example, and without limitation, as described later in this disclosure.

The backward reshaping metadata (152), as generated by the backward reshaping function generator (150) based on the reshaped SDR images (134) and the target HDR images (120), may be multiplexed as part of the video signal 144, for example, as supplemental enhancement information (SEI) messaging.

In some embodiments, backward reshaping metadata (152) is carried in the video signal as a part of overall image metadata, which is separately carried in the video signal from the single layer in which the SDR images are encoded in the video signal. For example, the backward reshaping metadata (152) may be encoded in a component stream in the coded bitstream, which component stream may or may not be separate from the single layer (of the coded bitstream) in which the SDR images (134) are encoded.

Thus, the backward reshaping metadata (152) can be generated or pre-generated on the encoder side to take advantage of powerful computing resources and offline encoding flows (including but not limited to content adaptive multiple passes, look ahead operations, inverse luma mapping, inverse chroma mapping, CDF-based histogram approximation and/or transfer, etc.) available on the encoder side.

The encoder architecture of FIG. 1A can be used to avoid directly encoding the target HDR images (120) into coded/ compressed HDR images in the video signal; instead, the backward reshaping metadata (152) in the video signal can be used to enable downstream decoding devices to backward reshape the SDR images (134) (which are encoded in the video signal) into reconstructed images that are identical to or closely/optimally approximate the reference HDR images (120).

In an embodiment, the reference SDR and HDR signals may be available in a color format not suitable for direct coding (e.g., in an RGB color format). Traditionally, such signals are translated to a codec-friendly format, such as YCbCr, YUV, and the like. Color transformation blocks 110 and 115 represent RGB to YCC transformations using a 3×3 RGB matrix and a 3×1 offset vector. As used herein, the term "YCC" denotes a generic luma-chroma-like color representation, similar to YUV and YCbCr, but generated from RGB input data using a proprietary color transformation. These blocks can be used to perform traditional color transformations (e.g., according to Rec.709 (Ref. [4]) or Rec.2020 (Ref [5])) or color transforms under coding efficiency constraints according to example embodiments to be presented in later sections.

In some embodiments, as illustrated in FIG. 1B, the video signal encoded with the reshaped SDR images in the single layer (144) and the backward reshaping metadata (152) as a part of the overall image metadata are received as input on the decoder side of the codec framework. A decompression block (154) decompresses/decodes compressed video data in the single layer (144) of the video signal into the decoded SDR images (156). Decompression 154 typically corresponds to the inverse of compression 142. The decoded SDR images (156) may be the same as the SDR images (134), subject to quantization errors in the compression block (142) and in the decompression block (154), which may have been optimized for SDR display devices. In a backward-compatible system, the decoded SDR images (156), after suitable inverse SDR color transformation (175) representing the inverse of the SDR color transform (110), may be outputted in an output SDR video signal (177) (e.g., over an HDMI interface, over a video link, etc.) to be rendered on an SDR display device.

Optionally, alternatively, or in addition, in the same or another embodiment, a backward reshaping block 158 extracts the backward (or forward) reshaping metadata (152) from the input video signal, constructs the backward reshaping functions based on the reshaping metadata (152), and performs backward reshaping operations on the decoded SDR images (156) based on the optimal backward reshaping functions to generate the backward reshaped images (160) (or reconstructed HDR images). In some embodiments, after suitable inverse HDR color transformation (170) (representing the inverse of HDR color transform 115), the backward reshaped images (172) represent production-quality or near-production-quality HDR images that are identical to or closely/optimally approximating the reference HDR images (105). The backward reshaped images (172) may be outputted in an output HDR video signal (e.g., over an HDMI interface, over a video link, etc.) to be rendered on an HDR display device.

In some embodiments, the color transform (170) may be part of display management operations specific to the HDR display device and may be performed on the backward reshaped images (160) as a part of HDR image rendering operations that render the backward reshaped images (160) on the HDR display device.

CONTENT PROTECTION VIA COLOR TRANSFORMATION

Returning to FIG. 1A, in an embodiment, let the reference HDR RGB signal (105) be converted to YCbCr by a 3×3 RGB to YCbCr matrix ($R^F_v$) and a 3×1 offset vector ($t^F_v$). The corresponding 3×3 YCbCr to RGB matrix ($R^B_v$) and the 3×1 offset vector ($t^B_v$) will be used at the decoder side (170). To ensure revertability, in an embodiment, the backward color transformation matrix is the inverse of forward matrix, i.e., $R^B_v=(R^F_v)^{-1}$. In an embodiment, the $R^B_v$ and $t^B_v$ values can be part of the metadata (152). Typically, but without limitation, $R^B_v$ and $t^B_v$ are determined using either the Rec.709 or the Rec.2020 specifications.

In block 110, the reference SDR RGB signal (108) will be color-converted using a 3×3 RGB to YCC color matrix ($R^F_s$) and a 3×1 offset vector ($t^F_s$) at the encoder side. For the inverse SDR color transform (175), the corresponding 3×3 YCC to RGB matrix ($R^B_s$) and 3×1 offset vector ($t^B_s$) will be used at the decoder side. To ensure revertability, the backward color transformation matrix is the inverse of forward matrix, i.e., $R^B_s=(R^F_s)^{-1}$. In an embodiment, the $R^B_s$ and $t^B_s$ data may be communicated as part of the metadata (152). The $R^B_s$ and $t^B_s$ are not necessary defined by the Rec.709 specification (or any other standards-based transform); in fact, they are the design parameters to be adjusted according to example embodiments. Note that, after forward reshaping (132), the reshaped signal (134) will be in the same color space as the output (125) of the SDR color transform (110). In a decoder, as represented by FIG. 1B, the following example operation scenarios are possible:

Content protection for authorized devices

As discussed, at the encoder side, the base layer is mapped to YCC via $R^F_s$ and $t^F_s$. Those parameters are designed by an algorithm to be described later and they are not the standard ones (e.g., Rec.709, Rec.2020, and the like). To recover the correct color, one needs the counterparts, $R^B_s$ and $t^B_s$. Since the $R^B_s$ and $t^B_s$ values are not necessary based on a standard, such as Rec.709, when a legacy device has no information about $R^B_s$ and $t^B_s$, the device will use the default Rec.709 matrix to convert YCC to RGB, which will generate an unwatchable picture in terms of color and brightness. In contrast, if a receiver has access to the correct $R^B_s$ and $t^B_s$ values, the color of the reconstructed SDR RGB image will be correct. Thus, in such a scenario, the proprietary color transformation can be used as an "authorization" mechanism to control viewing of even the SDR version of the HDR content.

In another embodiment, the proprietary color information may be used as a "fingerprint" or "watermarking" scheme. For example, a content provider may decide to use different color transformation matrices for different distribution regions (e.g., Europe, Asia, U.S., etc.) or for specific streaming providers (e.g., Amazon, Hulu, and the like).

Recovery of HDR content

Under an HDR playback mode, one may use the incoming metadata to reconstruct an HDR RGB image from the baseline YCC SDR image using only one color transformation. In an embodiment, this is feasible by using a cross-color predictor, such as the multiple color channel, multiple regression (MMR) predictor (Ref. [1]). The property of the MMR predictor can enable a decoder to recover the HDR data in the correct YCbCr color, even though the color of the SDR source is incorrect. Given the YCbCr HDR output (160), one can convert it from YCbCr to RGB using the $R^B_v$ and $t^B_v$-related metadata.

In summary, in an embodiment, the $R^B_s$ and $t^B_s$ color-transform parameters may play a key role to protect the content. As long as a device doesn't have the correct $R^B_s$ and $t^B_s$, using a default YCC2RGB matrix will generate an incorrect output. With careful design of $R^B_s$ and $t^B_s$, to maintain or even improve coding efficiency, one can create an unwatchable base layer and even increase the compression efficiency. In the following sections, methods to construct $R^B_s$ and $t^B_s$ to achieve those goals are presented.

As discussed earlier, one would like to design an SDR RGB-to-YCC color transform $\{R^F_s, t^F_s\}$ and a corresponding SDR YCC-to-RGB $\{R^B_s, t^B_s\}$ inverse color transform under a constrain to maintain or improve coding efficiency. Denote the 12 coefficients in $R^F_s$ and $t^F_s$ as $$R^F_s = \begin{bmatrix} r_{00} & r_{01} & r_{02} \\ r_{10} & r_{11} & r_{12} \\ r_{20} & r_{21} & r_{22} \end{bmatrix}, \text{ and} \tag{1}$$

$$t^F_s = \begin{bmatrix} t_0 \\ t_1 \\ t_2 \end{bmatrix}.$$

Given the forward transform parameters, the backward or inverse transform part can be derived from forward transform as:

$$R^B_s = (R^F_s)^{-1} \tag{2}$$

and $$t^B_s = t^F_s$$

As long as any coefficient in the RGB to YCC matrix is deviated from a standards-based matrix (e.g., the Rec.709 matrix), using the regular Rec.709 matrix to convert to RGB will show wrong color and brightness. While there appears to be great flexibility in deriving the $R^F_s$ and $t^F_s$ parameters, those parameters cannot be chosen randomly, because they may affect coding efficiency, given that all coding standards were designed under the assumption of operating in the YCbCr color space. Thus, two main concerns need to be addressed: (1) the overall video coding efficiency should be maintained and (2) luma/chroma information leakage should be prohibited.

In an embodiment, one can derive the new matrix based on an existing color space conversion matrix, such as Rec.709 or Rec.2020. Denote a standard-based color transformation set (e.g., such as those defined in Rec.709 or Rec.2020) as $$M^F_s = \begin{bmatrix} m_{s,00} & m_{s,01} & m_{s,02} \\ m_{s,10} & m_{s,11} & m_{s,12} \\ m_{s,20} & m_{s,21} & m_{s,22} \end{bmatrix}, \text{ and} \tag{3}$$

$$n^F_s = \begin{bmatrix} n_{s,0} \\ n_{s,1} \\ n_{s,2} \end{bmatrix}.$$

For example, under Rec. 709, for the SMPTE range ([16, 235] for 8-bit codewords):

$$M^F_s = \begin{bmatrix} 0.1819 & 0.6118 & 0.0618 \\ -0.1003 & -0.3373 & 0.4375 \\ 0.4375 & -0.3974 & -0.0401 \end{bmatrix}, \text{ and}$$

$$n^F_s = \begin{bmatrix} 0.0625 \\ 0.5 \\ 0.5 \end{bmatrix}.$$

For the full range ([0, 1))

$$M^F_s = \begin{bmatrix} 0.2126 & 0.7152 & 0.0722 \\ -0.1146 & -0.3854 & 0.5 \\ 0.5 & -0.4542 & -0.0458 \end{bmatrix}, \text{ and}$$

$$n^F_s = \begin{bmatrix} 0 \\ 0.5 \\ 0.5 \end{bmatrix}.$$

Let $$M^B_s = (M^F_s)^{-1} \tag{4}$$

In an embodiment, the new coefficients in $R^F_s$ are obtained by multiplying $M^F_s$ with another 3×3 matrix $W_s$, where $$W_s = \begin{bmatrix} w_{00} & w_{01} & w_{02} \\ w_{10} & w_{11} & w_{12} \\ w_{20} & w_{21} & w_{22} \end{bmatrix}. \tag{5}$$

Thus:

$$R^F_s = W_s M^F_s \tag{6}$$

and $$R^B_s = (R^F_s)^{-1} = (W_s M^F_s)^{-1} = (M^F_s)^{-1} (W_s)^{-1} \tag{7}$$

For $W_s$ equal to the identity matrix I, then $$R^F_s = M^F_s$$

Denote the three input components of the i-th pixel of the RGB SDR signal as a 3×1 vector $$s_i = \begin{bmatrix} s_{i,0} \\ s_{i,1} \\ s_{i,2} \end{bmatrix}. \tag{8}$$

After applying the $M^F_s$ transform, the intermediate results is $s'_i = M^F_s s_i$. For the i-th pixel, $$s'_i = \begin{bmatrix} s'_{i,0} \\ s'_{i,1} \\ s'_{i,2} \end{bmatrix} = \begin{bmatrix} m_{s,00} & m_{s,01} & m_{s,02} \\ m_{s,10} & m_{s,11} & m_{s,12} \\ m_{s,20} & m_{s,21} & m_{s,22} \end{bmatrix} \begin{bmatrix} s_{i,0} \\ s_{i,1} \\ s_{i,2} \end{bmatrix}. \tag{9}$$

After multiplication with $W_s$, the result $s'' = W_s s'$ is given by $$s''_i = \begin{bmatrix} s''_{i,0} \\ s''_{i,1} \\ s''_{i,2} \end{bmatrix} = \begin{bmatrix} w_{00} & w_{01} & w_{02} \\ w_{10} & w_{11} & w_{12} \\ w_{20} & w_{21} & w_{22} \end{bmatrix} \begin{bmatrix} s'_{i,0} \\ s'_{i,0} \\ s'_{i,0} \end{bmatrix}. \tag{10}$$

For the 3×1 vector, define a new vector $p^F_s$ $$p^F_s = \begin{bmatrix} p_0 \\ p_1 \\ p_2 \end{bmatrix}. \tag{11}$$

The final 3×1 vector is $$t^F_s = p^F_s + n^F_s \qquad (12)$$

or $$t^F_s = \begin{bmatrix} t_0 \\ t_1 \\ t_2 \end{bmatrix} = \begin{bmatrix} p_0 \\ p_1 \\ p_2 \end{bmatrix} + \begin{bmatrix} n_{s,0} \\ n_{s,1} \\ n_{s,2} \end{bmatrix}.$$

The combination of s" and $t^F_s$ values represents the base layer, which will be passed to video compression module:

$$\tilde{s}_i = s''_i + t^F_s = R^F_s s_i + t^F_s = W_s M^F_s s_i + t^F_s \qquad (13)$$

or $$\tilde{s}_i = \begin{bmatrix} \tilde{s}_{i,0} \\ \tilde{s}_{i,1} \\ \tilde{s}_{i,2} \end{bmatrix} = \begin{bmatrix} s''_{i,0} \\ s''_{i,1} \\ s''_{i,2} \end{bmatrix} + \begin{bmatrix} t_0 \\ t_1 \\ t_2 \end{bmatrix} = \begin{bmatrix} s''_{i,0} \\ s''_{i,1} \\ s''_{i,2} \end{bmatrix} + \begin{bmatrix} p_0 \\ p_1 \\ p_2 \end{bmatrix} + \begin{bmatrix} n_{s,0} \\ n_{s,1} \\ n_{s,2} \end{bmatrix}.$$

Consider first the case of leaving the luminance component unchanged. Then, the design freedom reduces from 12 parameters to 8 parameters.

$$W_s = \begin{bmatrix} 1 & 0 & 0 \\ w_{10} & w_{11} & w_{12} \\ w_{20} & w_{21} & w_{22} \end{bmatrix}, \text{ and}$$

$$p^F_s = \begin{bmatrix} 0 \\ p_1 \\ p_2 \end{bmatrix}.$$

One can further constrain the matrix to not allow luminance leakage into chroma (i.e. no luma and chroma crosstalk), as in $$W_s = \begin{bmatrix} 1 & 0 & 0 \\ 0 & w_{11} & w_{12} \\ 0 & w_{21} & w_{22} \end{bmatrix}. \qquad (15)$$

Since the luma component is unchanged, one may assume that the video compression efficiency depends on the energy in both chroma components. Thus, in an embodiment, coding efficiency can be controlled by having another constraint: the chroma energy after a transformation by $W_s$ should be proportional to the chroma energy before the transform. In other words, given a scaler $\alpha^2$:

$$s''^2_{i,1} + s''^2_{i,2} = \alpha^2((s'_{i,1})^2 + (s'_{i,2})^2) \qquad (16)$$

If $\alpha=1$, then the chroma energies before and after the adjustment are identical, and the impact to the video compression codec should be minimal. On the other hand, if it is desired to increase the margin of color encryption, to make the parameters harder to guess, one may allow a small $\delta \geq 0$ difference (e.g., $\delta = 0.1$), such that $$1 - \delta \leq \alpha \leq 1 + \delta$$

while meeting the energy constraint.

Note that increasing this chroma scaling factor is equivalent to allocating more codewords to chroma in the base layer, thus, the baseband signal quantization loss becomes less and it is expected to have better video coding gain, which was also verified by numerical simulations. Then, one can derive the design guideline for the 3×3 matrix, $W_s$, as follows. Substituting $s''_1$ and $s''_2$ from the $W_s$ matrix, one gets $$(w_{11}s'_{i,1} + w_{12}s'_{i,2})^2 + (w_{21}s'_{i,1} + w_{22}s'_{i,2})^2 = \alpha^2(s'_{i,1})^2 + \alpha^2(s'_{i,2})^2$$

By rearranging the equation, $$((w_{11})^2 + (w_{21})^2 - \alpha^2)(s'_{i,1})^2 + ((w_{12})^2 + (w_{22})^2 - \alpha^2)(s'_{i,2})^2 + 2(w_{11}w_{12} + w_{21}w_{22})s'_{i,1}s'_{i,2} = 0$$

To satisfy all $s'_{i,1}$ and $s'_{i,2}$ values, the matrix coefficients need to satisfy the following set of equations:

$$\begin{cases} (w_{11})^2 + (w_{21})^2 = \alpha^2 \\ (w_{12})^2 + (w_{22})^2 = \alpha^2 \\ w_{11}w_{12} + w_{12}w_{22} = 0 \end{cases} \qquad (17)$$

Equation (17) represents the core constraints for the proposed design. Without limitation, examples which satisfy equation (17) include:

First Example

Let $\theta$ denote a control parameter such that, for example $$\begin{bmatrix} w_{11} & w_{12} \\ w_{21} & w_{22} \end{bmatrix} = \begin{bmatrix} \alpha\cos(\theta) & -\alpha\sin(\theta) \\ \alpha\sin(\theta) & \alpha\cos(\theta) \end{bmatrix}. \qquad (18)$$

Note that equation (18) may be rewritten in multiple other variations by a simple transposing of the locations of cos ($\theta$) and sin ($\theta$), and changing their corresponding sign to satisfy equation (17). For example:

$$\begin{bmatrix} w_{11} & w_{12} \\ w_{21} & w_{22} \end{bmatrix} = \begin{bmatrix} \alpha\sin(\theta) & -\alpha\cos(\theta) \\ \alpha\cos(\theta) & \alpha\sin(\theta) \end{bmatrix}.$$

The $\theta$ parameter may be expressed in degrees or radians, e.g., $\theta \in [0, 2\pi]$ or $\theta \in [0, 360]$ degrees.

Second Example

A simple swap of Cb and Cr also satisfies equation (17), yielding $$\begin{bmatrix} w_{11} & w_{12} \\ w_{21} & w_{22} \end{bmatrix} = \begin{bmatrix} 0 & \alpha \\ \alpha & 0 \end{bmatrix}. \qquad (19)$$

Again, by appropriately changing the signs one may generate alternative variations, as in $$\begin{bmatrix} w_{11} & w_{12} \\ w_{21} & w_{22} \end{bmatrix} = \begin{bmatrix} 0 & -\alpha \\ -\alpha & 0 \end{bmatrix}. \qquad (20)$$

To generate the 3×1 $p^F_s$ vector, the combined 3×3 matrix $W_s$ and $p^F_s$ vector need to satisfy the following constrains so that the final output of normalized data is within the range [0, 1], i.e., no data is clipped:

$$0 \leq \tilde{s}_i = s''_i + t^F_s \leq 1$$

or $$\begin{cases} 0 \leq s''_{i,0} + p_0 + n_{s,0} \leq 1 \\ 0 \leq s''_{i,1} + p_1 + n_{s,1} \leq 1 \\ 0 \leq s''_{i,2} + p_2 + n_{s,2} \leq 1 \end{cases} \qquad (21)$$

Or more precisely, the 3×1 $p^F_s$ vector is derived so that $$\begin{cases} -\min\{s''_{i,0}\} - n_{s,0} \le p_0 \le 1 - \max\{s''_{i,0}\} - n_{s,0} \\ -\min\{s''_{i,1}\} - n_{s,1} \le p_1 \le 1 - \max\{s''_{i,1}\} - n_{s,1} \\ -\min\{s''_{i,2}\} - n_{s,2} \le p_2 \le 1 - \max\{s''_{i,2}\} - n_{s,2} \end{cases} \quad (22)$$

If $p^F_s$ does not exist, one will need to go back to re-design $W_s$. For example, under equation (18), one would need to select new values for $\alpha$ and $\theta$.

Note that adjusting the offset is equivalent to adjusting the DC value of chroma. This kind of adjustment won't affect the coding efficiency when using lossy video compression.

In an embodiment, one may also apply a simple linear scaling and an offset to the luma component to utilize additional base layer codewords and thus reducing the baseband quantization error and improve coding efficiency. In this case, equation (5) reduces from 12 parameters to 10 parameters.

$$W_s = \begin{bmatrix} \beta & 0 & 0 \\ w_{10} & w_{11} & w_{12} \\ w_{20} & w_{21} & w_{22} \end{bmatrix}, \quad (23)$$

and $$p^F_s = \begin{bmatrix} p_0 \\ p_1 \\ p_2 \end{bmatrix}.$$

Furthermore, to satisfy equations (17) and (22), the values of $\beta$ and $P_0$ also need to be constrained so that the reshaped luma SDR, $\tilde{s}_{i,0}$, is not clipped. Thus, given the constraint of $$0 \le \tilde{s}_{i,0} \le 1,$$

then $$0 \le \beta s'_{i,0} + p_0 + n_{s,0} \le 1 \quad (24)$$

From equation (24), given a value of $\beta$, the offset $P_0$ is determined as $$-\beta \min\{s'_{i,0}\} - n_{s,0} \le p_0 \le 1 - \beta \max\{s'_{i,0}\} - n_{s,0} \quad (25)$$

When one maps the luma to the full range of the base layer (e.g., [0, 1)), these parameters can be chosen as follows:

$$\beta = \frac{1}{\max\{s'_{i,0}\} - \min\{s'_{i,0}\}}, \quad (26)$$

$$p_0 = -\beta \min\{s'_{i,0}\} - n_{s,0}. \quad (27)$$

Figure 2:
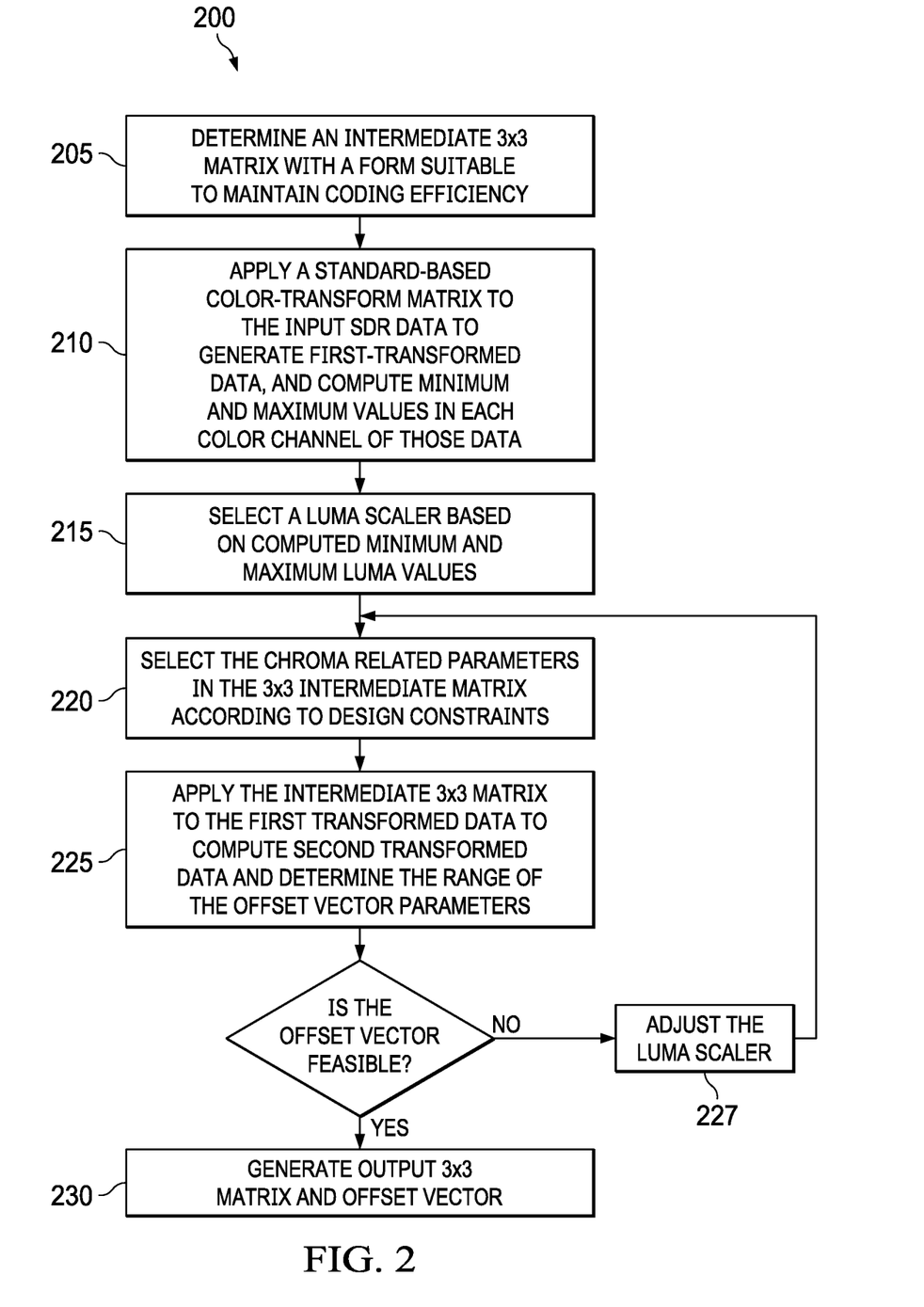
FIG. 2 depicts an example process to generate color transformation parameters according to an embodiment.

FIG. 2 depicts an example flow (200) for determining a color transformation matrix RFs according to an embodiment. In step 205, one starts with a simplified 3×3 form of an intermediate 3×3 matrix, $W_s$, that satisfies equation (17), the constraint for maintaining coding efficiency. For example, without loss of generality, one may use a combination of equations (18) and (23), to start with the form of $$W_s = \begin{bmatrix} \beta & 0 & 0 \\ 0 & \alpha\cos(\theta) & -\alpha\sin(\theta) \\ 0 & -\alpha\sin(\theta) & \alpha\cos(\theta) \end{bmatrix}, \quad (28)$$

and $$p^F_s = \begin{bmatrix} p_0 \\ p_1 \\ p_2 \end{bmatrix}.$$

In this example, one has to determine parameters $\beta$, $\alpha$, $\theta$, and vector $p^F_s$.

In an embodiment, the design flow may proceed as follows:

STEP 210: Given a standard-based color-transform matrix, $M^F_s$, (e.g., the one from Rec. 709 and the like), and the reference input SDR data ($s_i$), compute $s'_i = M^F_s s_i$, and determine the min and max value in each color channel of the transformed data, i.e., $\min\{s'_{i,ch}\}$ and $\max\{s'_{i,ch}\}$, where ch denotes one of the three color channels (e.g., Y, Cb, or Cr).

STEP 215: In this step a luma scaler may be selected. For example, if $\beta \ne 1$, one needs to determine $\beta$. Its upper bound is bounded by the max and min luma values computed in step 210. Selecting $\beta > 1$ can increase the coding efficiency in luma but may force more iterations in this process to generate the output color transformation matrix. From equation (26), $$\beta = \frac{1}{\max\{s'_{i,0}\} - \min\{s'_{i,0}\}}.$$

STEP 220: In this step one can select the chroma-related parameters in $W_s$, e.g., $\alpha$ and $\theta$. Selecting $\alpha > 1$ can increase the coding efficiency in chroma. Selecting $\theta \ne 0$ can change the color, thus (optionally) offering a simple content-protection mechanism. At the end of this step the matrix Ws is fully defined.

STEP 225: Apply $W_s$ to the output of step 210 to compute $s''_i = W_s s'_i$ for each pixel. These values will assist in selecting the offset 3×1 vector. For example, from equations (25) and (27), given the standard-based offset vector $n^F_s = [n_{s,0}, n_{s,01}, n_{s,02}]$ $$\begin{cases} \max\{-\beta\min\{s'_{i,0}\} - n_{s,0}, -\min\{s''_{i,0}\} - n_{s,0}\} \le p_0 \\ -\min\{s''_{i,1}\} - n_{s,1} \le p_1 \\ -\min\{s''_{i,2}\} - n_{s,2} \le p_2 \end{cases}$$

$$\begin{cases} p_0 \le \min\{1 - \beta\max\{s'_{i,0}\} - n_{s,0}, 1 - \max\{s''_{i,0}\} - n_{s,0}\} \\ p_1 \le 1 - \max\{s''_{i,1}\} - n_{s,1} \\ p_2 \le 1 - \max\{s''_{i,2}\} - n_{s,2} \end{cases}.$$

If no solution is feasible from STEP 225, then, after optional adjusting of the luma scaler (227), one may need to go back to step 220 and select alternative values for $\alpha$ and/or $\theta$. Otherwise, after one defines the parameters of vector $p^F_s$, in step 230, one can generate the final matrix $R^F_s = W_s M^F_s$ and offset $t^F_s = p^F_s + n^F_s$.

In a decoder, given $R^B_s = (R^F_s)^{-1}$ and $t^B_s = t^F_s$, the YCC-to-RGB color conversion operation comprises:

$$s_i = R^B_s(\tilde{s}_i - t^B_s).$$

Existing reshaping techniques may be frame-based, that is, new reshaping metadata is transmitted with each new frame, or scene-based, that is, new reshaping metadata is transmitted with each new scene. As used herein, the term "scene" for a video sequence (a sequence of frames/images) may relate to a series of consecutive frames in the video sequence sharing similar luminance, color and dynamic range characteristics. Scene-based methods work well in video-workflow pipelines which have access to the full scene; however, it is not unusual for some scenes to include just a single frame (e.g., in fade-ins and fade outs).

Process 200 can also be updated at the frame or scene level as needed; however, to maintain coding efficiency, it is preferred to maintain the same color transform within the whole sequence, a scene, or within a group of pictures (GOP). To adapt process 200 for a scene or a group of pictures, one may replace the frame-based minimum and maximum pixel values with scene-based minimum and maximum pixel values. For example, equation (26) may be rewritten as $$\beta = \frac{1}{s'^{,L}_{max,0} - s'^{,L}_{min,0}},$$

where $$s'^{,L}_{max,0} = \max(\{\max\{s'^{ij}_{i,0}\} | j \in L\}),$$

$$s'^{,L}_{min,0} = \min(\{\min\{s'^{ij}_{i,0}\} | j \in L\}),$$

wherein for L consecutive frames, $\max\{s'^{ij}_{i,0}\}$ and $\min\{s'^{ij}_{i,0}\}$ denote the maximum and minimum pixels value in the j-th frame of s' for the 0-th (e.g., Luma) color component. At the sequence level, the $s'^{,L}_{max,0}$ and $s'^{,L}_{min,0}$ can be computed values or the SMPTE constrained-range values. Scene-based minimum and maximum pixel values for each of the color components of s" can be computed in a similar way.

Building the Reshaping Functions

As discussed earlier, the non-standard color transform $R^F_s$ (110) may also be used as part of a system which allows reconstruction of a close approximation of the reference HDR input (105) from received reshaped SDR data. One could apply backward reshaping (158) after applying the proper inverse SDR transformation on the received base layer (156); however, with proper forward reshaping, one can eliminate an extra inverse color transformation step and extract directly the reconstructed HDR content in a proper (e.g., standard-defined) YCbCr color space. This process will be described next. Without limitation, some steps are described in the context of what is referred to as a three-dimensional mapping table (3DMT or d3DMT) representation, where, to simplify operations, each frame is represented as a three dimensional mapping table, where each color component (e.g., Y, Cb, or Cr) is subdivided into "bins," and instead of using explicit pixel values to represent an image one uses the pixel averages within each bin. Details of the 3DMT formulation can be found in Ref [2].

In an embodiment, the step (130) of generating a forward reshaping function requires two sets of reference inputs: (1) reference HDR YCbCr pixel values (120) and (2) reference SDR YCC pixel values (125). For the HDR signal, denote the three color components of the input i-th pixel of reference RGB HDR data as a 3×1 vector $$v_i = \begin{bmatrix} v_{i,0} \\ v_{i,1} \\ v_{i,2} \end{bmatrix}. \quad (29)$$

Denote the RGB to YCbCr matrix and offset vectors to be used during HDR color conversion (115) as $$M^F_v = \begin{bmatrix} m_{v,00} & m_{v,01} & m_{v,02} \\ m_{v,10} & m_{v,11} & m_{v,12} \\ m_{v,20} & m_{v,21} & m_{v,22} \end{bmatrix}, \quad (30)$$

and $$n^F_v = \begin{bmatrix} n_{v,0} \\ n_{v,1} \\ n_{v,2} \end{bmatrix}.$$

The YCbCr HDR value, $\tilde{v}$, is obtained via multiplying a matrix $M^F_v$ and adding the offset, i.e. $\tilde{v} = M^F_v v + n^F_v$. Thus, for the i-th pixel $$\tilde{v}_i = \begin{bmatrix} \tilde{v}_{i,0} \\ \tilde{v}_{i,1} \\ \tilde{v}_{i,2} \end{bmatrix} = \begin{bmatrix} m_{v,00} & m_{v,01} & m_{v,02} \\ m_{v,10} & m_{v,11} & m_{v,12} \\ m_{v,20} & m_{v,21} & m_{v,22} \end{bmatrix} \begin{bmatrix} v_{i,0} \\ v_{i,1} \\ v_{i,2} \end{bmatrix} + \begin{bmatrix} n_{v,0} \\ n_{v,1} \\ n_{v,2} \end{bmatrix}. \quad (31)$$

For the SDR input, instead of taking the output from the existing standard-based RGB to YCbCr transform, one uses the output of the modified transform, which from equation (13) is given as:

$$\tilde{s}_i = \begin{bmatrix} \tilde{s}_{i,0} \\ \tilde{s}_{i,1} \\ \tilde{s}_{i,2} \end{bmatrix} = \begin{bmatrix} s''_{i,0} \\ s''_{i,1} \\ s''_{i,2} \end{bmatrix} + \begin{bmatrix} p_0 \\ p_1 \\ p_2 \end{bmatrix} + \begin{bmatrix} n_{s,0} \\ n_{s,1} \\ n_{s,2} \end{bmatrix}. \quad (32)$$

Given these two reference signals, one can apply known methods to generate the forward and backward reshaping functions. As an example, and without limitation, the luma forward reshaping function may be constructed via a cumulative-density function (CDF) matching process (Ref [2-3]), where one: a) computes a histogram of the HDR luma signal $\{\tilde{v}_{i,0}\}$, denoted as $\{h_v(b)\}$, and a histogram of the color-transformed SDR luma signal $\{\tilde{s}_{i,0}\}$, denoted as $\{h_s(b)\}$, b) builds SDR and HDR cumulative density functions based on the two histograms, and c) uses CDF matching to obtain a look-up table (FLUT) to map HDR YCbCr input data to SDR YCC data. This can be expressed as $$T^F_Y = \text{CDF\_MATCHING}(\{h_v(b)\}, \{h_s(b)\}),$$

where $T^F_Y$ denotes the forward mapping to be used in block 132.

For chroma, a d3DMT representation (Ref [2]) is constructed using a parametric (e.g., MMR) representation between the HDR signal $\{\tilde{v}_{i,0}\}$ and the SDR signals $\{\tilde{s}_{i,0}\}$. Denote the d3DMT pair-entry as $(\tilde{v}_{i,0}, \tilde{v}_{i,1}, \tilde{v}_{i,2})$ and $(\tilde{s}_{i,0}, \tilde{s}_{i,1}, \tilde{s}_{i,2})$. Assume there are P such bins/pairs. For example, given an MMR expanded model described as $$\overline{v}_i = [1 \, \tilde{v}_{i,0} \tilde{v}_{i,1} \tilde{v}_{i,2} \ldots \tilde{v}_{i,0} \tilde{v}_{i,1} \ldots (\tilde{v}_{i,0} \tilde{v}_{i,2})^2 \ldots (\tilde{v}_{i,1})^2 (\tilde{v}_{i,2})^2 \ldots]$$

one can collect all P bins together for all HDR three-channel inputs $$V^F = \begin{bmatrix} \overline{v}_0 \\ \overline{v}_1 \\ \vdots \\ \overline{v}_{P-1} \end{bmatrix}.$$

Then, let the ch channel in SDR be denoted as $$s_{ch} = \begin{bmatrix} \tilde{s}_{0,ch} \\ \tilde{s}_{1,ch} \\ \vdots \\ \tilde{s}_{P-1,ch} \end{bmatrix}.$$

Using an "a/B" representation, where T denotes a transpose matrix, $$B^F = (V^F)^T V^F$$

$$\alpha^F_{ch} = (V^F)^T s_{ch}$$

Under a mean-square error (MSE) minimization criterion, the optimal MMR coefficients to minimize the prediction error to the target reference SDR signal, $s_{ch}$, can be given as:

$$m^F_{ch} = (B^F)^{-1} \alpha^F_{ch} \quad (33)$$

and the forward reshaped SDR d3DMT entry can be expressed as:

$$\hat{s}_{ch} = V^F m^F_{ch}$$

The backward luma reshaping function can be generated by first reversely tracking the forward LUT to generate a backward reshaping 1D-LUT (BLUT), denoted as $T^B_Y$, and then approximated the $T^B_Y$ mapping as a piece-wise polynomial function (e.g., using an 8-piece-wise approximation using second-order polynomials).

To generate the chroma backward reshaping mapping, one can also use a polynomial approximation (e.g., MMR) by considering a parametric model between: (a) the 3-channel forward reshaped SDR bin in d3DMT and (2) the original HDR chroma bin in d3DMT.

Denote the MMR expanded form for the i-th forward reshaped SDR bin as $$\bar{s}_i = [1 \hat{s}_{i,0} \hat{s}_{i,1} \hat{s}_{i,2} \ldots \hat{s}_{i,0} \hat{s}_{i,1} \ldots (\hat{s}_{i,0} \hat{s}_{i,1})^2 \ldots (\hat{s}_{i,1})^2 (\hat{s}_{i,2})^2 \ldots]$$

After collecting all P bins together for all three SDR channel inputs $$S^B = \begin{bmatrix} \bar{s}_0 \\ \bar{s}_1 \\ \vdots \\ \bar{s}_{P-1} \end{bmatrix}.$$

Given the vector HDR representation for the ch channel as $$v_{ch} = \begin{bmatrix} \tilde{v}_{0,ch} \\ \tilde{v}_{1,ch} \\ \vdots \\ \tilde{v}_{P-1,ch} \end{bmatrix}$$

and another "a/B" representation, $$B^B = (S^B)^T S^B$$

$$\alpha^B_{ch} = (S^B)^T v_{ch}$$

the optimal MMR coefficients to minimize the prediction error between the reference HDR signal and the reconstructed HDR signal is given by $$m^B_{ch} = (B^B)^{-1} \alpha^B_{ch} \quad (34)$$

and the reconstructed HDR signal (160) can be generated as:

$$\hat{v}^B_{ch} = S^B m^B_{ch}$$

Metadata 152 include the values of $T^B_Y$ and $\{m^B_{ch}\}$.

References

Each of these references is incorporated by reference in its entirety.

1. G-M. Su et al., "Multiple color channel multiple regression predictor," U.S. Pat. No. 8,811,490.
2. Q. Song et al., PCT Patent Application Ser. No. PCT/US2019/031620, "High-fidelity full reference and high-efficiency reduced reference encoding in end-to-end single-layer backward compatible encoding pipeline," filed on May 9, 2019, published as WO 2019/217751.
3. B. Wen et al., " Inverse luma/chroma mappings with histogram transfer and approximation," U.S. Pat. No. 10,264,287.
4. Rec. ITU-R BT. 709, "Parameter values for the HDTV standards for production and international programme exchange," ITU, 06/2015.
5. Rec. ITU-R BT. 2020, "Parameter values for ultra-high definition television systems for production and international programme exchange," ITU, 06/2014.

EXAMPLE COMPUTER SYSTEM IMPLEMENTATION

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to color transformations under a coding-efficiency constraint for the coding of HDR video, such as those described herein. The computer and/or IC may compute, any of a variety of parameters or values that relate to color transformations under a coding-efficiency constraint for the coding of HDR video as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for color transformations under a coding-efficiency constraint for the coding of HDR video as described above by executing software instructions in a program memory accessible to the processors. The invention may also be provided in the form of a program product. The program product may comprise any non-transitory and tangible medium which carries a set of computer-readable signals comprising instructions which, when executed by a data processor, cause the data processor to execute a method of the invention. Program products according to the invention may be in any of a wide variety of non-transitory and tangible forms. The program product may comprise, for example, physical media such as magnetic data storage media including floppy diskettes, hard disk drives, optical data storage media including CD ROMs, DVDs, electronic data storage media including ROMs, flash RAM, or the like. he computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to color transformations under a coding-efficiency constraint for the coding of HDR video are thus described. In the foregoing specification, embodiments of the present invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE 1. A method for generating color transform data under coding efficiency constraints, the method comprising:
receiving an input image in a first dynamic range and in a first color space;
accessing a first 3×3 color-transform matrix and a first 3×1 offset vector based on a color transform from the first color space to a standard-based color space;
applying (210) to the input image the first 3×3 color-transform matrix to generate a first image with luminance and chroma components;
generating minimum and maximum pixel values for the first image for the luminance and the chroma components;
computing (215) a luminance scaler based on the minimum and maximum luminance pixel values in the first image;
computing elements of a 2×2 chroma-transform matrix based on a coding-efficiency constraint and the first 3×3 color-transform matrix;
forming a 3×3 intermediate transform matrix based on the luminance scaler and the 2×2 chroma-transformation matrix;
applying (225) the 3×3 intermediate transform matrix to the first image to generate a second image;
generating an intermediate 3×1 offset vector based on the first offset vector and minimum and maximum pixel values in the luminance and chroma components of the second image; and generating (230):
an output 3×3 color-transform matrix by multiplying the first 3×3 color-transform matrix with the 3×3 intermediate transform matrix;
an output 3×1 offset vector by adding the first 3×1 offset vector to the intermediate 3×1 offset vector; and
an output image in a second color space by adding to pixel values of the second image the output 3×1 offset vector.

EEE 2. The method of EEE 1, further comprising:
generating a reverse 3×3 color-transform matrix and a reverse 3×1 offset vector to transform image data from the second color space to the first color space, wherein the reverse 3×1 offset vector is equal to the output 3×1 offset vector and the reverse 3×3 color-transform matrix comprises the inverse of the output 3×3 color-transform matrix.

EEE 3. The method of EEE 1 or 2, wherein the first color space comprises an RGB color space, the standard-based color space comprises a YCbCr color space, and the first 3×3 color-transform matrix and the first 3×1 offset vector are based on either the Rec. 709 or Rec. 2020 standards.

EEE 4. The method of any one of the previous EEEs, wherein the luminance scaler is either set to 1 or it is bounded by $$\frac{1}{\max\{s'_{i,0}\} - \min\{s'_{i,0}\}},$$

wherein $s'_{i,0}$ denotes a luminance value for the i-th pixel in the first image normalized in [0,1], $\max\{s'_{i,0}\}$ denotes the maximum luminance value in the first image and $\min\{s'_{i,0}\}$ denotes the minimum luminance value in the first image.

EEE 5. The method of any one of the previous EEEs, wherein the coding-efficiency constraint when computing elements of a 2×2 chroma-transform matrix comprises an energy preservation criterion for chroma values of pixels in the first image before and after a chroma-transformation by the 2×2 chroma-transform matrix.

EEE 6. The method of EEE 5, wherein the energy preservation criterion comprises $$(s''_{i,1})^2 + (s''_{i,2})^2 = \alpha^2((s'_{i,1})^2 + (s'_{i,2})^2)$$

wherein for the i-th pixel, $s'_{i,1}$ and $s'_{i,2}$ denote its chroma values before applying the 2×2 chroma-transform matrix and $s''_{i,1}$ and $s''_{i,2}$ denotes its chroma values after applying the 2×2 chroma-transform matrix.

EEE 7. The method of EEE 6, wherein for a 2×2 transform matrix $$\begin{bmatrix} w_{11} & w_{12} \\ w_{21} & w_{22} \end{bmatrix},$$

under the energy preservation criterion $$(w_{11})^2 + (w_{21})^2 = \alpha^2$$

$$(w_{12})^2 + (w_{22})^2 = \alpha^2$$

$$w_{11}w_{12} + w_{12}w_{22} = 0$$

wherein $\alpha$ is a constant close to 1.

EEE 8. The method of EEE 7, wherein the 2×2 transform matrix comprises $$\begin{bmatrix} w_{11} & w_{12} \\ w_{21} & w_{22} \end{bmatrix} = \begin{bmatrix} \alpha\cos(\theta) & -\alpha\sin(\theta) \\ \alpha\sin(\theta) & \alpha\cos(\theta) \end{bmatrix},$$

wherein θ corresponds to a free parameter in [0, 2π].

EEE 9. The method of any one of the previous EEEs, wherein forming the 3×3 intermediate transform matrix Ws comprises forming $$W_s = \begin{bmatrix} \beta & 0 & 0 \\ 0 & \alpha\cos(\theta) & -\alpha\sin(\theta) \\ 0 & -\alpha\sin(\theta) & \alpha\cos(\theta) \end{bmatrix},$$

wherein β denotes the luminance scaler and α and θ are parameters.

EEE 10. The method of EEE 6 or EEE 9, wherein α=1, or 1−δ≤α≤1+δ,
wherein δ is parameter smaller than 0.5.

EEE 11. The method of any one of the previous EEEs, wherein generating the intermediate 3×1 offset vector $[p_0 p_1 p_2]^T$ comprises computing offset vector elements to satisfy offset-vector constraints
—min{$s''_{i,0}$}−$n_{s,0}$≤$p_0$≤1−max{$s''_{i,0}$}−$n_{s,0}$
—min{$s''_{i,1}$}−$n_{s,1}$≤$p_1$≤1−max{$s''_{i,1}$}−$n_{s,1}$
—min{$s''_{i,2}$}−$n_{s,2}$≤$p_2$≤1−max{$s''_{i,2}$}−$n_{s,2}$
wherein $s''_{i,j}$ denotes a pixel value for the j-th color component of the i-th pixel in the second image and $[n_{s,0} n_{s,1} n_{s,2}]^T$ denotes the first offset vector.

EEE 12. The method of EEE 11, further comprising, upon determining that at least one offset vector element does not satisfy its offset-vector constraint, then iterating by:
forming an updated 3×3 intermediate transform matrix based on an updated luminance scaler and/or an updated 2×2 chroma-transformation matrix;
applying (225) the updated 3×3 intermediate transform matrix to the first image to generate the second image; and generating the intermediate 3×1 offset vector to satisfy the offset-vector constraints.

EEE 13. The method of any one of the previous EEEs, further comprising:
receiving a first high dynamic range (HDR) image in the first color space representing the same scene as the first image but in a second dynamic range higher than the first dynamic range;
applying a standard-based color transform to the first HDR image to generate a second HDR image in the second dynamic range;
applying a forward reshaping function to the second HDR image to generate a base-image in the first dynamic range, wherein the forward reshaping function maps pixel values from the second dynamic range and the standard-based color space to pixel values in the first dynamic range and the second color space;
compressing the base-image to generate a compressed image in the second color space; and storing an output signal comprising the compressed image, the output 3×3 color-transform matrix, the output 3×1 offset vector, and parameters for a backward reshaping function to reconstruct an output HDR image based on the compressed image.

EEE 14. The method of EEE 13, wherein in a decoder receiving the output signal, further comprising:
decompressing the compressed image to generate an intermediate base signal in the first dynamic range and the second color space; and
generating either a first output signal in the first color space and the first dynamic range based on the intermediate base signal, the output 3×3 color-transform matrix, and the output 3×1 offset vector, or
generating an HDR output signal in the standard color space based on the intermediate base signal and the parameters for the backward reshaping function, wherein the backward reshaping function maps pixel values from the second color space and the first dynamic range to the standard-based color space and the second dynamic range.

EEE 15. A non-transitory computer-readable storage medium having stored thereon computer-executable instructions for executing with one or more processors a method in accordance with any one of the EEEs 1-14.

The invention claimed is:

1. A method for generating color transform data under coding efficiency constraints, the method performed using a processor comprising:
receiving an input image by the processor in a first dynamic range and in a first color space, and using the processor:
accessing a first 3×3 color-transform matrix and a first 3×1 offset vector based on a color transform from the first color space to a standard-based color space;
applying to the input image the first 3×3 color-transform matrix to generate a first image with luminance and chroma components;
generating minimum and maximum pixel values for the first image for the luminance components;
computing a luminance scaler based on the minimum and maximum luminance pixel values in the first image;
computing elements of a 2×2 chroma-transform matrix based on a coding-efficiency constraint and the first 3×3 color-transform matrix;
forming a 3×3 intermediate transform matrix based on the luminance scaler and the 2×2 chroma-transformation matrix;
applying the 3×3 intermediate transform matrix to the first image to generate a second image;
generating minimum and maximum pixel values for the second image for the luminance and the chroma components;
generating an intermediate 3×1 offset vector based on the first offset vector and minimum and maximum pixel values in the luminance and chroma components of the second image; and generating using the processor:
an output 3×3 color-transform matrix by multiplying the first 3×3 color-transform matrix with the 3×3 intermediate transform matrix;
an output 3×1 offset vector by adding the first 3×1 offset vector to the intermediate 3×1 offset vector; and
an output image in a second color space by adding to pixel values of the second image the output 3×1 offset vector.

2. The method of claim 1, further comprising:
generating a reverse 3×3 color-transform matrix and a reverse 3×1 offset vector to transform image data from the second color space to the first color space, wherein the reverse 3×1 offset vector is equal to the output 3×1 offset vector and the reverse 3×3 color-transform matrix comprises the inverse of the output 3×3 color-transform matrix.

3. The method of claim 1, wherein the first color space comprises an RGB color space, the standard-based color space comprises a YCbCr color space, and the first 3×3 color-transform matrix and the first 3×1 offset vector are based on either the Rec. 709 or Rec. 2020 standards.

4. The method of claim 1, wherein the luminance scaler is either set to 1 or it is bounded by $$\frac{1}{\max\{s'_{i,0}\} - \min\{s'_{i,0}\}},$$

wherein $s'_{i,0}$ denotes a luminance value for the i-th pixel in the first image normalized in [0,1], max $\{s'_{i,0}\}$ denotes the maximum luminance value in the first image and min $\{s'_{i,0}\}$ denotes the minimum luminance value in the first image.

5. The method of claim 1, wherein the coding-efficiency constraint when computing elements of a 2×2 chroma-transform matrix comprises an energy preservation criterion for chroma values of pixels in the first image before and after a chroma-transformation by the 2×2 chroma-transform matrix.

6. The method of claim 5, wherein the energy preservation criterion comprises $$(s''_{i,1})^2 + (s''_{i,2})^2 = \alpha^2((s'_{i,1})^2 + (s'_{i,2})^2),$$

wherein for the i-th pixel, $s'_{i,1}$ and $s'_{i,2}$ denote its chroma values before applying the 2×2 chroma-transform matrix and $s''_{i,1}$ and $s''_{i,2}$ denotes its chroma values after applying the 2×2 chroma-transform matrix.

7. The method of claim 6, wherein for a 2×2 transform matrix $$\begin{bmatrix} w_{11} & w_{12} \\ w_{21} & w_{22} \end{bmatrix},$$

under the energy preservation criterion $$(w_{11})^2 + (w_{21})^2 = \alpha^2$$

$$(w_{12})^2 + (w_{22})^2 = \alpha^2,$$

$$w_{11}w_{12} + w_{12}w_{22} = 0$$

wherein $\alpha$ is a constant close to 1.

8. The method of claim 7, wherein the 2×2 transform matrix comprises $$\begin{bmatrix} w_{11} & w_{12} \\ w_{21} & w_{22} \end{bmatrix} = \begin{bmatrix} \alpha\cos(\theta) & -\alpha\sin(\theta) \\ \alpha\sin(\theta) & \alpha\cos(\theta) \end{bmatrix},$$

wherein $\theta$ corresponds to a free parameter in $[0, 2\pi]$.

9. The method of claim 6, wherein $\alpha = 1$, or $$1 - \delta \leq \alpha \leq 1 + \delta,$$

wherein $\delta$ is parameter smaller than 0.5.

10. The method of claim 1, wherein forming the 3×3 intermediate transform matrix $W_s$ comprises forming $$W_s = \begin{bmatrix} \beta & 0 & 0 \\ 0 & \alpha\cos(\theta) & -\alpha\sin(\theta) \\ 0 & -\alpha\sin(\theta) & \alpha\cos(\theta) \end{bmatrix},$$

wherein $\beta$ denotes the luminance scaler and $\alpha$ and $\theta$ are parameters.

11. The method of claim 1, wherein generating the intermediate 3×1 offset vector $[p_0 p_1 p_2]^T$ comprises computing offset vector elements to satisfy offset-vector constraints —$\min\{s''_{i,0}\} - n_{s,0} \leq p_0 \leq 1 - \max\{s''_{i,0}\} - n_{s,0}$
—$\min\{s''_{i,1}\} - n_{s,1} \leq p_1 \leq 1 - \max\{s''_{i,1}\} - n_{s,1}$
—$\min\{s''_{i,2}\} - n_{s,2} \leq p_2 \leq 1 - \max\{s''_{i,2}\} - n_{s,2}$ wherein $s''_{i,j}$ denotes a pixel value for the j-th color component of the i-th pixel in the second image and $[n_{s,0} n_{s,1} n_{s,2}]^T$ denotes the first offset vector.

12. The method of claim 11, further comprising, upon determining that at least one offset vector element does not satisfy its offset-vector constraint, then iterating by:
forming an updated 3×3 intermediate transform matrix based on an updated luminance scaler and/or an updated 2×2 chroma-transformation matrix;
applying the updated 3×3 intermediate transform matrix to the first image to generate the second image;
and generating the intermediate 3×1 offset vector to satisfy the offset-vector constraints.

13. The method of claim 1, further comprising:
receiving a first high dynamic range (HDR) image in the first color space representing the same scene as the first image but in a second dynamic range higher than the first dynamic range;
applying a standard-based color transform to the first HDR image to generate a second HDR image in the second dynamic range;
applying a forward reshaping function to the second HDR image to generate a base-image in the first dynamic range, wherein the forward reshaping function maps pixel values from the second dynamic range and the standard-based color space to pixel values in the first dynamic range and the second color space;
compressing the base-image to generate a compressed image in the second color space;
and storing an output signal comprising the compressed image, the output 3×3 color-transform matrix, the output 3×1 offset vector, and parameters for a backward reshaping function to reconstruct an output HDR image based on the compressed image.

14. The method of claim 13, wherein in a decoder receiving the output signal, further comprising:
decompressing the compressed image to generate an intermediate base signal in the first dynamic range and the second color space; and
generating either a first output signal in the first color space and the first dynamic range based on the intermediate base signal, the output 3×3 color-transform matrix, and the output 3×1 offset vector, or
generating an HDR output signal in the standard color space based on the intermediate base signal and the parameters for the backward reshaping function, wherein the backward reshaping function maps pixel values from the second color space and the first dynamic range to the standard-based color space and the second dynamic range.

15. A non-transitory computer-readable storage medium having stored thereon computer-executable instructions for executing with one or more processors a method in accordance with claim 1.

* * * * *